United States Patent
Pilot et al.

(10) Patent No.: US 8,176,302 B2
(45) Date of Patent: May 8, 2012

(54) DATA PROCESSING ARRANGEMENT COMPRISING A RESET FACILITY

(75) Inventors: Laurent Pilot, Antibes (FR); Albert Hameury, Nice (FR)

(73) Assignee: NXP B.V., Eindhoven (NL)

( * ) Notice: Subject to any disclaimer, the term of this patent is extended or adjusted under 35 U.S.C. 154(b) by 668 days.

(21) Appl. No.: 12/090,992

(22) PCT Filed: Sep. 26, 2006

(86) PCT No.: PCT/IB2006/053501
§ 371 (c)(1),
(2), (4) Date: Aug. 22, 2008

(87) PCT Pub. No.: WO2007/049162
PCT Pub. Date: May 3, 2007

(65) Prior Publication Data
US 2009/0019274 A1 Jan. 15, 2009

(30) Foreign Application Priority Data
Oct. 25, 2005 (EP) .................................... 05300857

(51) Int. Cl.
*G06G 9/48* (2006.01)
(52) U.S. Cl. ............................................... 713/1; 713/2
(58) Field of Classification Search .................... 713/1–2
See application file for complete search history.

(56) References Cited

U.S. PATENT DOCUMENTS

| 5,070,450 | A | | 12/1991 | Holman, Jr. et al. | |
|---|---|---|---|---|---|
| 5,583,987 | A | * | 12/1996 | Kobayashi et al. | 714/13 |
| 5,659,748 | A | * | 8/1997 | Kennedy | 713/2 |
| 6,467,007 | B1 | * | 10/2002 | Armstrong et al. | 710/260 |
| 6,665,795 | B1 | | 12/2003 | Roth et al. | |
| 6,748,527 | B1 | | 6/2004 | Utsumi et al. | |
| 7,251,723 | B2 | * | 7/2007 | Lam | 713/1 |
| 7,418,627 | B2 | * | 8/2008 | Baba | 714/24 |
| 7,853,835 | B2 | * | 12/2010 | Baba | 714/55 |
| 2002/0133693 | A1 | * | 9/2002 | Morrison et al. | 713/1 |
| 2005/0289390 | A1 | * | 12/2005 | Baba | 714/11 |
| 2007/0136567 | A1 | * | 6/2007 | Kim et al. | 713/1 |

FOREIGN PATENT DOCUMENTS

| JP | 55118225 A | 9/1980 |
|---|---|---|
| JP | 04205118 A | 7/1992 |
| JP | 05-189089 A | 7/1993 |
| JP | 05210529 A | 8/1993 |
| JP | 05324597 A | 12/1993 |
| JP | 10-020968 A | 1/1998 |

* cited by examiner

*Primary Examiner* — M Elamin

(57) ABSTRACT

A data processing arrangement (MPS) comprises a plurality of data processors (SPR, PM1, . . . , PM4) that can be reset individually. A reset module (RSM) handles various reset request signals (HRG, SRG, SRP1, . . . , SRP4) in accordance with a prioritization and timing scheme so as to obtain respective reset signals (GRS, PRS1, . . . , PRS4) for respective data processors (SPR, PM1, . . . , PM4). The reset module (RSM) preferably comprises a reset request register, which stores respective reset requests that the respective reset request signals convey, and a request execute register, which stores respective granted reset requests that the reset signals convey.

18 Claims, 3 Drawing Sheets

DATA PROCESSING ARRANGEMENT COMPRISING A RESET FACILITY

FIELD OF THE INVENTION

The invention relates to a data processing arrangement that comprises a reset facility for resetting one or more processor modules that form part of the data processing arrangement. The data processing arrangement may be, for example, a multiprocessor system for a cellular phone. The invention further relates to a method of resetting a data processing arrangement, a computer program product for a data processing arrangement, and an apparatus.

DESCRIPTION OF PRIOR ART

U.S. Pat. No. 6,665,795 describes a pipelined processor that includes a reset unit, which provides an output reset signal to at least one stage of the pipeline. The reset unit detects at least a hard reset request, a soft reset request, and an emulation reset request. The reset unit asserts the reset signal for at least N clock cycles after the reset request has been cleared. The reset unit handles the reset request as a reset event having an assigned priority. A bit within an event pending register is updated to indicate that the reset event is currently pending. A bit within an event status register is updated when an event handler accepts the reset event.

SUMMARY OF THE INVENTION

According to an aspect of the invention, a data processing arrangement comprises a plurality of data processors that can be reset individually. A reset module handles various reset request signals in accordance with a prioritization and timing scheme so as to obtain respective reset signals for respective data processors.

The invention takes the following aspects into consideration. A data processor generally has a reset facility, which allows the data processor to be reset. A reset brings the data processor in a well-defined initial state. A reset may have a physical origin, such as, for example, the pushing of a button. Such a reset is often referred to as a hardware reset. A reset may also have a logical origin, such as, for example, a software program that comprises a reset instruction, which is reached in the course of the execution of the software program. Such a reset is often referred to as a software reset.

A data processor is typically reset by means of a reset signal, which is applied to the data processor. A reset signal is typically a binary signal, which can either be a binary one (1) or a binary zero (0) at a given instant. The data processor is in a released state when the reset signal is a binary one (1) and in a reset state when the reset signal is a binary zero (0), or vice versa. A transition from a binary one (1) to a binary zero (0), or vice versa, causes a reset. An opposite transition from a binary zero (0) to a binary one (1), or vice versa, releases the data processor after the reset.

Resetting a data processor that forms part of a multiprocessor system requires special consideration. The data processor will generally be functionally interrelated with one or more other data processors. The data processor carries out operations, which affect operations that the other data processors carry out, and vice versa. Consequently, the manner in which a reset of a particular data processor is handled may affect the operations that the other data processors carry out, and will thus affect the operation of the multiprocessor system as a whole. This functional interrelationship between various data processors makes resetting a critical and complex issue.

For example, let it be assumed that, in a multiprocessor system, a data processor "A" is reset and shortly after another data processor "B" is reset. This sequence of resetting "A" before B" within a relatively short time interval may bring the multiprocessor system in an undesired state. It would have been better to have stalled the reset of data processor "A" until data processor "B" had been reset: the sequence "B before A" would have been more appropriate.

Releasing various data processors that are each in a reset state may also be a critical and complex issue. For example, let it be assumed that two data processors "C" and "D" have just been reset and should be released. Releasing data processors "C" and "D" simultaneously may bring the multiprocessor system in an undesired state, which may require a new reset. Releasing data processor "D" before data processor "C", or vice versa, is more appropriate. Whether releasing data processor "D" before "C" or data processor "C" before "D" is more appropriate, may depend on the state of another data processor, or any other element within the multiprocessor system, such as, for example, a memory. This further complicates matters.

Reset issues in a multiprocessor system may be dealt with at a software level. For example, the multiprocessor system may comprise a system software program for a data processor that carries out system tasks. The system software program may be designed so that an undesired state is prevented for each possible reset configuration that may occur within the multiprocessor system. The multiprocessor system may further comprise various dedicated processing software programs for data processors that carry out dedicated processing tasks. Each dedicated processing software program may also be designed so that the data processor, which executes the dedicated processing software program, handles a reset in dependence on possible resets of the other data processors, as well as other relevant events that may occur within the multiprocessor system.

In summary, careful software design, which takes into account all possible reset configurations that may occur within the multiprocessor system, allows satisfactory operation of the multiprocessor system. However, such a careful software design requires a considerable effort and is therefore relatively time-consuming and costly. A relatively small modification of the multiprocessor system will generally require a considerable modification of each software program for the multiprocessor system.

In accordance with the aforementioned aspect of the invention, a data processing arrangement comprises a reset module that handles various reset request signals in accordance with a prioritization and timing scheme so as to obtain respective reset signals for respective data processors.

The reset module allows a centralized reset handling that prevents the data processing arrangement, which is a multiprocessor system, from reaching an undesired state due to one or more resets. The reset module handles resets independently from the data processors within the multiprocessor system. The data processors need not carry out a reset handling task; a data processor merely issues a reset request when appropriate and conforms to the reset signal that the data processor receives, which determines whether the data processor is in a released state or in a reset state. This considerably simplifies software design. A system software program and dedicated processing software programs, if any, need not take into account issues of prioritizing and timing various resets. Consequently, a relatively small modification of the multiprocessor system requires only a relatively small modification at a software level or at a hardware level, or both. For those reasons, the invention allows a relatively fast design, which reduces costs.

An implementation of a data processing arrangement in accordance with the invention preferably comprises a reset request register and a request execute register. The reset request register stores respective reset requests that the respective reset request signals convey. The request execute register stores respective granted reset requests, which the reset signals convey. This facilitates the so-called debugging of the multiprocessor system because a debugger can monitor what is happening at a reset level. The reset requests register and execute reset register provide observability.

These and other aspects of the invention will be described in greater detail hereinafter with reference to drawings.

DETAILED DESCRIPTION

Figure 1:
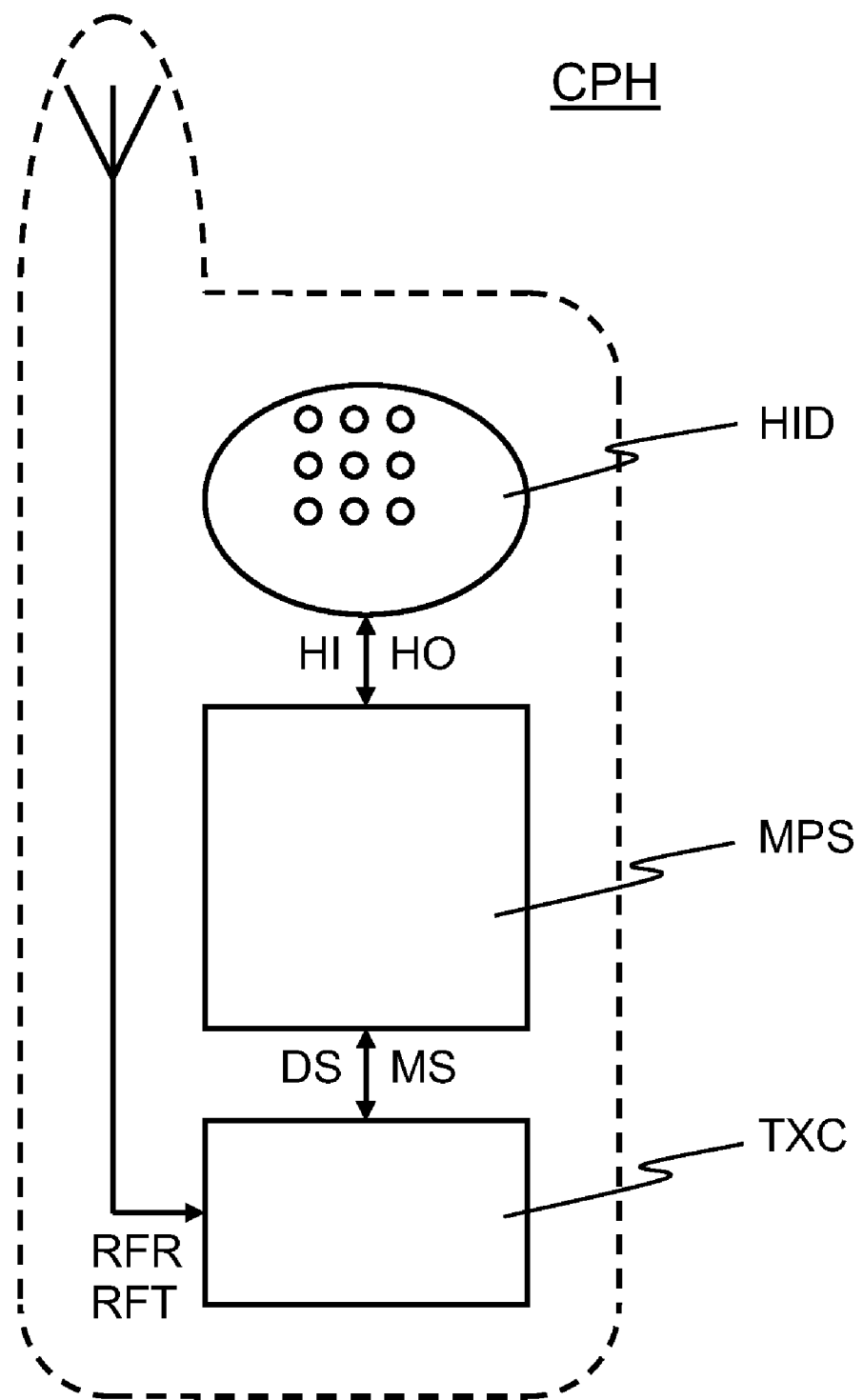
FIG. 1 is a block diagram that illustrates a cellular phone.

FIG. 1 illustrates a cellular phone CPH. The cellular phone CPH comprises a transmitter-and-receiver circuit TXC, a multiprocessor system MPS, and human interface devices HID. The human interface devices HID typically comprise a small loudspeaker, a small microphone, a display device, and a numerical keyboard for dialing a number.

The multiprocessor system MPS carries out operations that relate to a user control or a system control of a cellular-phone communication, or both. For example, let it be assumed that a user instructs the cellular phone CPH to setup a call with a particular phone number. The multiprocessor system MPS handles this process by, for example, displaying a personal phone book if the user so requests. The multiprocessor system MPS also carries out various operations that are needed to set up the call. For example, in a Global System for Mobile Communication (GSM), the multiprocessor system MPS typically handles GSM system-level operations, which involves signaling and time-slot management.

In a reception mode, the transmitter-and-receiver circuit TXC provides a demodulation signal DS in response to a received radiofrequency signal RFR. The multiprocessor system MPS processes the demodulation signal DS, which may comprise data from a calling party or data from a base station or another cellular-phone network entity, or any combination of such data. For example, the multiprocessor system MPS may derive a human-interface input signal HI from the demodulation signal DS. The human-interface input signal HI may be, for example, an audio signal for the small loudspeaker. This demodulation-signal processing typically comprises one or more channel-decoding operations and one or more error-correction operations, such as, for example, a Viterbi decoding.

In a transmission mode, there is an opposite signal flow, which starts with a human-interface output signal HO. For example, the multiprocessor system MPS may receive an audio signal that the small microphone provides in response to a spoken word. The multiprocessor system MPS processes the human-interface output signal HO so as to obtain a modulation signal MS. This modulation-signal processing typically comprises one or more channel-coding operations and one or more error-coding operations, which are complementary with those in the demodulation-signal processing described hereinbefore. The transmitter-and-receiver circuit TXC emits a transmission radiofrequency signal RFT, which comprises the modulation signal MS.

Figure 2:
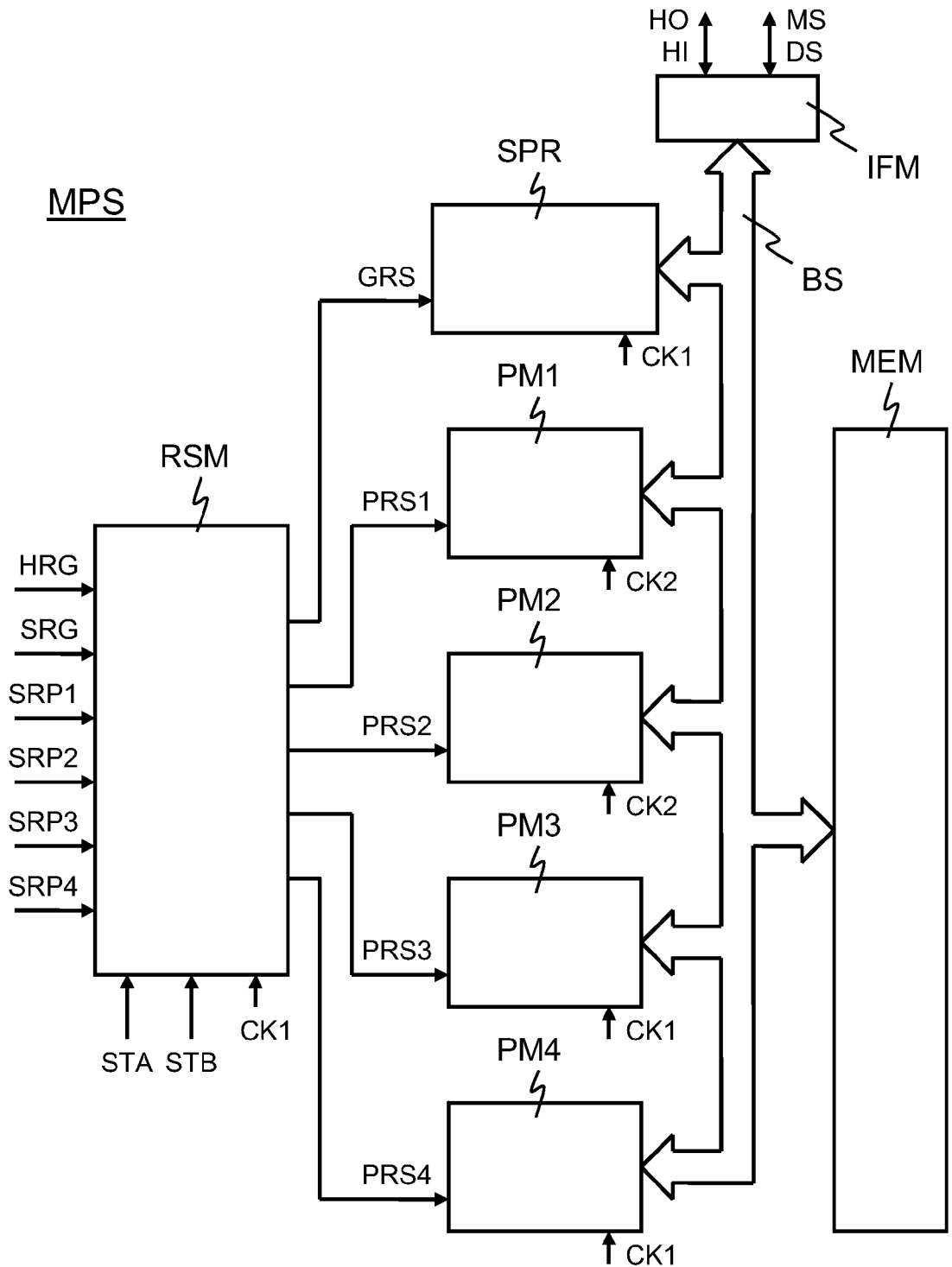
FIG. 2 is a block diagram that illustrates a multiprocessor system, which forms part of the cellular phone.

FIG. 2 illustrates the multiprocessor system MPS. The multiprocessor system MPS comprises a system processor SPR, various data processing modules PM1, ..., PM4, a memory MEM, and an interface module IFM. The aforementioned entities may communicate with each other via a bus BS. The multiprocessor system MPS further comprises a reset module RSM. The reset module RSM applies various reset signals GRS, PRS1, ..., PRS4 to the system processor SPR and the data processing modules PM1, ..., PM4 on the basis of various reset request signals HRG, SRG, SRP1, ..., SRP4 and status signals STA, STB. This will be described in greater detail hereinafter. The aforementioned entities may receive different clock signals. FIG. 2 illustrates that the system processor SPR, data processing modules PM3, PM4 receive clock signal CK1, whereas data processing modules PM1, PM2 receive clock signal CK2. That is, the multiprocessor system MPS operates with a multi-clock scheme.

The system processor SPR may comprise a program memory in which a system software program is stored. The system software program comprises a set of instructions that defines one or more functions, which the system processor SPR carries out. Similarly, a data processing module may comprise a program memory in which a dedicated processing software program is stored. The dedicated processing software program comprises a set of instructions that defines one or more processing functions that the data processing module carries out. Alternatively, a data processing module may be in the form of a dedicated circuit that carries out one or more functions, which are hardware-defined rather than software-defined. In such an implementation, respective elements of the circuit and respective connections between these elements define the one or more functions that the data processing module carries out. The multiprocessor system MPS may be implemented, for example, in a single integrated circuit. Such an implementation constitutes a so-called system on chip (SoC).

The multiprocessor system MPS basically operates as follows. The interface module IFM receives input data, which is comprised in the human interface output signal HO and the demodulation signal DS. This input data may be temporarily stored in the memory MEM before the input data is processed. One or more data processing modules PM1, ..., PM4 process the input data depending on the type of input data.

For example, let it be assumed that data processing module PM1 carries out a Viterbi decoding. Convolutional encoded input data, which is comprised in the demodulation signal DS, may then be applied to data processing module PM1. Accordingly, data processing module PM1 will provide decoded input data, which may be temporarily stored in the memory MEM. Data processing module PM2 may subsequently process the decoded input data. The multiprocessor system MPS thus provides a processing chain for the input data that originates from the demodulation signal DS. This processing chain can be described as follows: input-data processing module PM1 (Viterbi decoding)-data processing module PM2 (further processing)-output.

The multiprocessor system MPS can provide various different processing chains. More specifically, the multiprocessor system MPS can process a particular type of input data by means of one processing chain and, simultaneously, process another type of input data by means of another processing chain. That is, the multiprocessor system MPS carries out various different processes at the same time. This requires coordination in terms of synchronization and prioritization, in particular because the multiprocessor system MPS operates with a multi-clock scheme as mentioned hereinbefore.

The system processor SPR has a coordinating function. For example, the system processor SPR may monitor occurrences of various events within the multiprocessor system MPS and may take appropriate action when a particular event occurs. Nevertheless, the multiprocessor system MPS may arrive in a state that requires a reset of one or more data processing modules PM1, . . . , PM4 or even a reset of the entire multiprocessor system MPS. A reset may also constitute an appropriate action that the system processor SPR takes. Saving power consumption may be another reason to reset one or more data processing modules PM1, . . . , PM4, or even the entire multiprocessor system MPS.

Resetting a data processing module brings the data processing module in a well-defined initial state. This can unblock one or more processes that were blocked so that processing may resume correctly. The same applies when the entire multiprocessor system MPS is reset; a reset brings the multiprocessor system MPS in a well-defined initial state, which provides a sound starting point for resuming a process or for starting a new process.

As mentioned hereinbefore, the reset module RSM receives various reset request signals HRG, SRG, SRP1, . . . , SRP4. These include a hardware global reset request signal HRG, a software global reset request signal SRG, and various processor reset request signals SRP1, . . . , SRP4, one for each data processing module PM1, . . . , PM4. A reset request signal may be in the form of, for example, a binary signal that can take two different values. One of these values, for example a binary zero (0), represents a reset request.

For example, there is a request for resetting the entire multiprocessor system MPS when the hardware global reset request signal HRG is a binary zero. There is a similar request when the software global reset request signal SRG is a binary zero. There is a request for resetting data processing module PM1 when processor reset request signal SRP1 is a binary zero. Similarly, there is a request for resetting data processing modules PM2, PM3, PM4 when processor request signals SRP2, SRP3, SRP4 are a binary zero, respectively.

The term "hardware" in association with "reset request" indicates that the reset request has a physical origin, such as, for example, the pushing of a button or the occurrence of a particular physical event within the multiprocessor system MPS. Conversely, the term "software" in association with "reset request" indicates that the reset request has a logical origin, such as, for example, a software program that executes a reset instruction, which forms part of the software program. The reset instruction may take the form of setting a particular bit in a reset register.

The hardware global reset request signal HRG may originate, for example, from an external pushbutton, which allows the user to reset the multiprocessor system MPS. The hardware global reset request signal HRG takes the value that represents a reset request when the external pushbutton is depressed. The hardware global reset request signal HRG may also originate, for example, from a detection circuit that detects whether a particular voltage exceeds a predetermined threshold voltage or not.

The software global reset request signal SRG may originate from the system processor SPR. The system processor SPR may issue a global reset request when a particular sequence of events has occurred within the multiprocessor system MPS. That is, the particular sequence of events causes the system software to arrive at a reset instruction. The reset instruction causes the software global reset request signal SRG to be a binary zero (0), which represents a global reset request.

One or more processor reset request signals SRP1, . . . , SRP4 may also originate from the system processor SPR. A processor reset request may result from a software-based mechanism similar to that described hereinbefore with regard to a software global reset request. A processor reset request signal may also originate from one or more data processing modules PM1, . . . , PM4.

For example, let it be assumed that data processing module PM3 and data processing module PM4 form a processing chain. Data processing module PM3 may detect the occurrence of an event within the processing chain, which requires a reset. In response, data processing module PM3 may issue a processor reset request, which concerns data processing module PM4, by causing processor reset request signal SRP4 to be a binary zero (0). Data processing module PM3 may also cause processor reset request signal SRP3 to be a binary zero (0), which may be considered as an auto-reset request.

As mentioned hereinbefore, the reset module RSM provides various reset signals GRS, PRS1, . . . , PRS4 on the basis of the various reset request signals HRG, SRG, SRP1, . . . , SRP4 and the status signals STA, STB, which the reset module RSM receives. More specifically, the reset module RSM provides a global reset signal GRS to the system processor SPR and various processor reset signals PRS1, . . . , PRS4, one for each data processing module PM 1, . . . , PM4, respectively. The global reset signal GRS may also be applied to one or more data processing modules PM1, . . . , PM4. For example, the global reset signal GRS and reset signal PRS1 may be applied to an OR gate. In such a variant, the OR gate provides a reset signal for data processing module PM1. Respective reset signals for data processing modules PM2, . . . , PM4 may be obtained in a similar fashion.

A reset signal may be in the form of, for example, a binary signal that can take two different values. For example, a transition from a binary one (1) to a binary zero (0) initiates a reset. The reset brings the entity concerned, which may be any one of the data processing modules PM1, . . . , PM4 or the system processor SPR, into a well-defined, initial state. The entity concerned may leave the initial state after an opposite transition, which means that the reset signal is again a binary one (1). The reset module RSM can thus release the entity concerned after a reset setting the reset signal to a binary one (1) again.

The reset module RSM, which receives the various reset request signals HRG, SRG, SRP1, . . . , SRP4 and the status signals STA, STB, handles reset requests in accordance with a prioritization and timing scheme. This scheme should ensure that the multiprocessor system MPS operates correctly after a reset. One aspect of the prioritization and timing scheme is to assign different priorities to different reset requests.

For example, let it be assumed that two reset requests occur simultaneously, or within a relatively short time interval: one reset request that concerns data processing module PM1, and another reset request that concerns data processing module PM2. It may be advantageous to first initiate a reset of data processing module PM1 and subsequently a reset of data processing module PM2 after a predefined number of clock cycles. Such a prioritized and timed execution of resets will allow the multiprocessor system MPS to finish one or more processes in an appropriate fashion. This will allow the multiprocessor system MPS to restart correctly after the respective resets.

Another aspect of the prioritization and timing scheme may concern a release after a reset. For example, let it be assumed that data processing module PM2 and data processing module PM3 form a processing chain. It may be advantageous that data processing module PM2 starts first from an initial state, which results from a reset, and that data processing module PM3 starts from an initial state only after a predetermined minimal number of clock cycles. That is, the reset module RSM releases data processing module PM3 from the initial state only after data processing module PM2 has been released from the initial state. Accordingly, the reset module RSM prevents that "things mess up again" after a reset.

Each different implementation of the multiprocessor system MPS, in terms of hardware and software, requires a different prioritization and timing scheme, which is specific to that implementation. For example, in a specific implementation, the reset module RSM may release data processing module from an initial state, which results from a reset, only when the memory MEM is ready. The memory MEM being ready means that can the data processing modules PM1, . . . , PM4 can write data or read data from the memory MEM.

Status signal STA may indicate whether the memory MEM is ready or not. For example, the memory MEM is ready when status signal STA is a binary one (1) whereas the memory MEM is not ready when status signal STA is a binary zero (0). In such an implementation, the prioritization and timing scheme takes into account status signal STA so as to determine when to release a data processing module.

The reset module RSM facilitates the development of a particular implementation of the multiprocessor system MPS. This is particularly true from a software respective. A software designer, who has to develop the system software program and various processing software programs for the data processing modules PM1, . . . , PM4, need not take into account all reset-related issues. This is because the reset module RSM deals with many reset-related issues of a particular hardware implementation of the multiprocessor system MPS. As explained hereinbefore, the reset module RSM deals with issues of prioritization and synchronization with regard to the various different reset requests that may occur within the multiprocessor system MPS. The software designer has an easier task when, for example, a new system software program or a new processing software program has to be developed, or both, for a given hardware platform.

Figure 3:
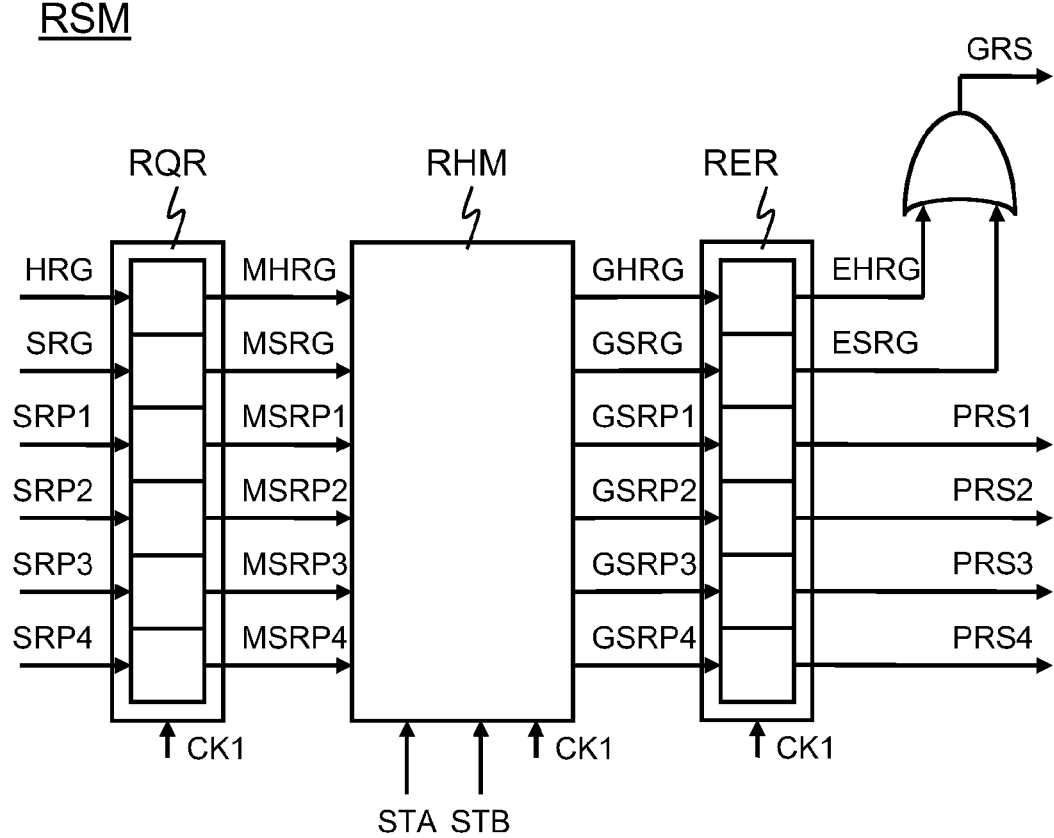
FIG. 3 is a block diagram that illustrates a reset module, which forms part of the multiprocessor system.

FIG. 3 illustrates the reset module RSM. The reset module RSM comprises a reset request register RQR, a request handling module RHM, and a reset execute register RER. The reset request register RQR comprises various cells, one for each reset request signal HRG, SRG, SRP1, . . . , SRP4. The same applies to the reset execute register RER.

The request handling module RHM may comprise various logic circuits, such as, for example, one or more counters, latches, and gates, or gates, and so on. The request handling module RHM may also comprise a programmable logic circuit that defines respective logic transfer functions between respective inputs and respective outputs of the request handling module RHM. Programming data, which is comprised in a nonvolatile memory and which is applied to be programmable logic circuit, defines these logic transfer functions. The request handling module RHM may also be software-based. In such an implementation, the request handling module RHM comprises a suitably programmed processor that provides respective logic transfer functions.

The reset module RSM operates as follows. The reset request register RQR memorizes reset requests that the reset request signals HRG, SRG, SRP1, . . . , SRP4 convey. For example, let it be assumed that the hardware global reset request signal HRG comprises a global reset request in the form of a small negative pulse. There is a transition from a binary one (1) to a binary zero (0) and an opposite transition after a relatively short time. The first mentioned transition clears a bit in the cell for the hardware global reset request signal HRG. The bit becomes a binary zero (0) and remains at that value after the opposite transition has occurred. The bit may be set to a binary one (1) again when, for example, the global reset request has been granted.

The cell for the hardware global reset request signal HRG applies a memorized hardware global reset request signal MHRG to the request handling module RHM. The memorized hardware global reset request signal MHRG has a value that corresponds with the value of the bit in the cell. In a similar fashion, the reset request register RQR applies a memorized software global reset signal MSRG and respective memorized processor reset request signals MSRG, MSRP1, . . . , MSRP4 to the request handling module RHM on the basis of the software global reset signal SRG and the respective processor reset request signals SRP1, . . . , SRP4, which the reset request register RQR receives. The reset request register RQR thus applies various different memorized reset request signals MHRG, MSRG, MSRP1, . . . , MSRP4 to the request handling module RHM.

The request handling module RHM provides various different granted reset request signals GHRG, GSRG, GSRP1, . . . , GSRP4 in response to the various different memorized reset request signals MHRG, MSRG, MSRP1, . . . , MSRP4. A granted reset request signal is associated with a particular memorized reset request signal and indicates whether a reset request, which the reset request signal conveys, is granted or not. Accordingly, the request handling module RHM provides a granted hardware global reset request signal GHRG, which indicates whether a hardware global reset request has been granted or not.

The granted hardware global reset request signal GHRG may be, for example, a binary signal that is a binary zero (0), which indicates that the hardware global reset request has been granted, or a binary one (1), which indicates that the aforementioned request has not been granted. In a similar fashion, the reset request register RQR provides a granted software global reset signal GSRG and respective granted processor reset request signals GSRP1, . . . , GSRP4.

The reset execute register RER memorizes reset requests that the request handling module RHM has granted. The reset execute register RER memorizes these granted reset requests in a fashion the similar to that in which the reset request register RQR memorizes the reset requests that the reset module RSM receives. The reset execute register RER comprises a cell for the granted hardware global reset request signal GHRG and a cell for the granted software global reset request signal GSRG. These cells apply an executed hardware global reset signal EHRG and an executed software global reset signal ESRG, respectively, to an OR gate. The OR gate provides the global reset signal GRS, which FIG. 2 illustrates. The reset execute register RER comprises a cell for each respective granted processor reset request signal GSRP1, . . . , GSRP4. These cells directly provide the respective processor reset signals PRS1, . . . , PRS4, which FIG. 2 illustrates.

The reset request register RQR and the reset execute register RER facilitate a so-called debugging of the multiprocessor system MPS. A debugging typically involves a specific software program, which is commonly called a debugger, which has a monitoring function. That is, the debugger monitors what is happening within the multiprocessor system MPS so as to detect possible causes of malfunctioning. The debugger may also force a particular value upon a reset-related signal, or any other signal, so as to test multiprocessor system MPS.

For example, the multiprocessor system MPS may arrive in an undesired state as a result of a specific sequence of events, which may involve one or more resets. The reset request register RQR and the reset execute register RER provides accurate information about requested resets and executed resets, respectively. The debugger can be arranged to read these registers so as to have a better picture of what is happening within the multiprocessor system MPS. The reset request register RQR and the reset execute register RER thus contribute to the observability of events within the multiprocessor system MPS, which allows a better understanding of possible causes of malfunctioning. It will generally require relatively little development effort to arrive at a point where the multiprocessor system MPS functions satisfactorily.

Concluding Remarks

The detailed description hereinbefore with reference to the drawings illustrates the following characteristics, which are cited in various independent claims. A data processing arrangement (MPS) comprises a plurality of data processors (SPR, PM1, . . . , PM4) that can be reset individually. A reset module (RSM) handles various reset request signals (HRG, SRG, SRP1, . . . , SRP4) in accordance with a prioritization and timing scheme so as to obtain respective reset signals (GRS, PRS1, . . . , PRS4) for respective data processors (SPR, PM1, . . . , PM4).

The detailed description hereinbefore further illustrates various optional characteristics, which are cited in the dependent claims. These characteristics may be applied to advantage in combination with the aforementioned characteristics. Various optional characteristics are highlighted in the following paragraphs. Each paragraph corresponds with a particular dependent claim.

The reset module (RSM) comprises a reset request register (RQR) for storing respective reset requests that the respective reset request signals (HRG, SRG, SRP1, . . . , SRP4) convey. This contributes to a relatively fast and low-cost design because, for example, a debugger can monitor reset requests that have been presented to the reset module (RSM).

The reset module (RSM) comprises a reset execute register (RER) for storing respective granted reset requests that the respective reset signals (GRS, PRS1, . . . , PRS4) convey. This contributes to a relatively fast and low-cost design because, for example, a debugger can monitor reset requests that the reset module (RSM) has granted, which causes resets.

The reset module (RSM) handles the respective reset request signals (HRG, SRG, SRP1, . . . , SRP4) on the basis of at least one status signal (STA, STB), which indicates a state within the data processing arrangement (MPS). This prevents inappropriate resets, which contributes to a satisfactory operation of the multiprocessor system.

The reset module (RSM) comprises an assembly of logic circuits that define the prioritization and timing scheme. This allows relatively low-cost implementations.

The reset module (RSM) comprises a programmable logic circuit that defines the prioritization and timing scheme. This allows flexibility at moderate cost.

The aforementioned characteristics can be implemented in numerous different manners. In order to illustrate this, some alternatives are briefly indicated.

The aforementioned characteristics may be implemented in any type of data processing arrangement. A cellular phone and a multiprocessor system for a cellular phone are merely examples. The data processing arrangement may equally be, for example, a television set, a portable video player a personal computer, a set-top box, a personal digital assistant, and so on, or a system on chip for any of the aforementioned products.

A reset request signal may take any form. The detailed description describes an example of a reset request signal that is in the form of a binary signal. A binary zero (0) represents a reset request. Conversely, a binary one (1) may represent a reset request in another reset request signal. A reset request signal need not necessarily be a binary signal. All what matters is that a reset request signal is capable of conveying a reset request. Similar remarks apply to the reset signals, which may take any form. All what matters is that a reset signal is capable of bringing a data processor in a reset state and, subsequently, releasing the data processor from the reset state.

A reset request signal may have any origin. The same applies to a status signal. A reset request signal may originate from, for example, any software program that is running on the data processing arrangement. A reset request signal may also originate from a software program that is running on another, external data processing arrangement. A status signal may also originate from an external entity. There may be different reset request signals that convey reset requests, which concern the same data processor. For example, the multiprocessor system that FIG. 2 illustrates may be modified so that there are two reset request signals for processing module PM1: one reset request signal that concerns a hardware reset and another reset request signal that concerns a software request.

The reset module may be implemented in numerous different manners. The reset module may be a dedicated circuit that comprises various elements and interconnections between these elements, which define operations that the reset module carries out. The reset module may also be a programmable circuit, which comprises a programmable memory with programming data. In such an implementation, the operations that the reset module carries out can be modified by modifying the programming data. Referring to FIG. 3, which illustrates an implementation, the reset module may comprise numerous different configurations of logic circuits coupled between the reset execute register and the respective outputs of the reset module. The reset execute register may also directly provide the respective reset signals without any intervention of logic circuits.

The term "data processor" should be understood in a broad sense. This term includes any circuit or system that is capable of processing input data of any kind.

There are numerous ways of implementing functions by means of items of hardware or software, or both. In this respect, the drawings are very diagrammatic, each representing only one possible embodiment of the invention. Thus, although a drawing shows different functions as different blocks, this by no means excludes that a single item of hardware or software carries out several functions. Nor does it exclude that an assembly of items of hardware or software or both carry out a function.

The remarks made herein before demonstrate that the detailed description with reference to the drawings, illustrate rather than limit the invention. There are numerous alternatives, which fall within the scope of the appended claims. Any reference sign in a claim should not be construed as limiting the claim. The word "comprising" does not exclude the presence of other elements or steps than those listed in a claim. The word "a" or "an" preceding an element or step does not exclude the presence of a plurality of such elements or steps.

The invention claimed is:

1. A data processing arrangement comprising:
a plurality of data processors that can be reset individually; and
a reset module for handling various reset request signals for each of the data processors in accordance with a prioritization and timing scheme so as to obtain respective reset signals for respective data processors, wherein the reset module is separate from each of the data processors for centralized handling of the reset request signals for each of the data processors, wherein the reset module comprises:

a reset request register;

a reset handling module; and a reset execute resister; and wherein the reset request register is configured to store a reset request signal for each of the data processors and to provide the stored reset request signals to the reset handling module.

2. The data processing arrangement according to claim 1, the reset module being arranged to handle the respective reset request signals on the basis of at least one status signal, which indicates a state within the data processing arrangement.

3. The data processing arrangement according to claim 1, the reset module comprising an assembly of hardware logic circuits that define the prioritization and timing scheme.

4. The data processing arrangement according to claim 1, the reset module comprising a programmable hardware logic circuit that defines the prioritization and timing scheme.

5. An apparatus comprising a data-processing arrangement according to claim 1.

6. An apparatus according to claim 5, further comprising a transmitter-and-receiver circuit, the data-processing arrangement being arranged to process a signal from the transmitter-and-receiver circuit.

7. The data processing arrangement according to claim 1, wherein the reset handling module is configured to generate granted reset request signals in response to the stored reset request signals and to output the granted reset request signals to the reset execute register.

8. The data processing arrangement according to claim 7, wherein the reset execute register is configured to store the granted reset request signals and to provide the stored and granted reset request signals to respective ones of the data processors.

9. The data processing arrangement according to claim 8, wherein the reset module comprises an assembly of hardware logic circuits that define the prioritization and timing scheme.

10. The data processing arrangement according to claim 8, wherein the reset module comprises a programmable hardware logic circuit that defines the prioritization and timing scheme.

11. The data processing arrangement according to claim 8, wherein the reset request register includes a different storage register for each of the data processors and wherein the reset execute register includes a different storage register for each of the data processors.

12. The data processing arrangement according to claim 11, wherein the reset request register includes a storage register for an incoming hardware global reset signal and a storage register for an incoming software global reset signal and wherein the reset execute register includes a storage register for an outgoing hardware global reset signal and a storage register for an outgoing software global reset signal.

13. A data processing arrangement comprising:

a plurality of data processors that can be reset individually; and a reset module for handling various reset request signals for each of the data processors in accordance with a prioritization and timing scheme so as to obtain respective reset signals for respective data processors, wherein the reset module comprises a reset request register, a reset handling module, and a reset execute resister;

wherein the reset request register is configured to store a reset request signal for each of the data processors and to provide the stored reset request signals to the reset handling module;

wherein the reset handling module is configured to generate granted reset request signals in response to the stored reset request signals and to output the granted reset request signals to the reset execute register; and wherein the reset execute register is configured to store the granted reset request signals and to provide the stored and granted reset request signals to respective ones of the data processors.

14. The data processing arrangement according to claim 13, wherein the reset request register includes a different storage register for each of the data processors and wherein the reset execute register includes a different storage register for each of the data processors.

15. The data processing arrangement according to claim 14, wherein the reset request register includes a storage register for an incoming hardware global reset signal and a storage register for an incoming software global reset signal and wherein the reset execute register includes a storage register for an outgoing hardware global reset signal and a storage register for an outgoing software global reset signal.

16. An apparatus comprising:

a transmitter-and-receiver circuit configured to generate a demodulation signal in response to a received radio frequency signal; and a data-processing arrangement configured to process the demodulation signal from the transmitter-and-receiver circuit, the data-processing arrangement comprising:

a plurality of data processors that can be reset individually; and a reset module for handling various reset request signals for each of the data processors in accordance with a prioritization and timing scheme so as to obtain respective reset signals for respective data processors, wherein the reset module comprises a reset request register, a reset handling module, and a reset execute resister;

wherein the reset request register is configured to store a reset request signal for each of the data processors and to provide the stored reset request signals to the reset handling module;

wherein the reset handling module is configured to generate granted reset request signals in response to the stored reset request signals and to output the granted reset request signals to the reset execute register; and wherein the reset execute register is configured to store the granted reset request signals and to provide the stored and granted reset request signals to respective ones of the data processors.

17. The data processing arrangement according to claim 16, wherein the reset request register includes a different storage register for each of the data processors and wherein the reset execute register includes a different storage register for each of the data processors.

18. The data processing arrangement according to claim 17, wherein the reset request register includes a storage register for an incoming hardware global reset signal and a storage register for an incoming software global reset signal and wherein the reset execute register includes a storage register for an outgoing hardware global reset signal and a storage register for an outgoing software global reset signal.

* * * * *